US011184682B2

(12) United States Patent
Smith

(10) Patent No.: US 11,184,682 B2
(45) Date of Patent: *Nov. 23, 2021

(54) OBTAINING VIEWER DEMOGRAPHICS THROUGH ADVERTISEMENT SELECTIONS

(71) Applicant: Roku, Inc., San Jose, CA (US)

(72) Inventor: Richard Smith, Cardiff (GB)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/128,860

(22) Filed: Dec. 21, 2020

(65) Prior Publication Data
US 2021/0136462 A1 May 6, 2021

Related U.S. Application Data

(63) Continuation of application No. 16/366,790, filed on Mar. 27, 2019, now Pat. No. 10,897,657, which is a continuation of application No. 15/725,260, filed on Oct. 4, 2017, now Pat. No. 10,277,958.

(51) Int. Cl.
H04N 21/25      (2011.01)
H04N 21/81      (2011.01)
H04N 21/258     (2011.01)
H04N 21/45      (2011.01)
H04N 21/482     (2011.01)
H04N 21/8545    (2011.01)
H04N 21/442     (2011.01)
H04N 21/4725    (2011.01)
H04N 21/44      (2011.01)

(52) U.S. Cl.
CPC ........ H04N 21/812 (2013.01); H04N 21/251 (2013.01); H04N 21/25883 (2013.01); H04N 21/44222 (2013.01); H04N 21/4532 (2013.01); H04N 21/4725 (2013.01); H04N 21/482 (2013.01); H04N 21/8545 (2013.01); H04N 21/44008 (2013.01)

(58) Field of Classification Search
None
See application file for complete search history.

(56) References Cited

U.S. PATENT DOCUMENTS

| 7,979,880 B2 | 7/2011 | Hosea et al. |
| 9,003,441 B1 | 4/2015 | Jindal et al. |
| 9,641,870 B1 | 5/2017 | Cormie et al. |
| 10,277,958 B2 | 4/2019 | Smith |

(Continued)

Primary Examiner — Jefferey F Harold
Assistant Examiner — Charles N Hicks
(74) Attorney, Agent, or Firm — McDonnell Boehnen Hulbert & Berghoff LLP

(57) ABSTRACT

A system and method includes operations and steps for inferring a demographic of a user based on a selection of an advertisement by the user. A media device stream is received from a media device by data processing hardware. The data processing hardware may identify frames of the media device stream for insertion of an overlay. The overlay can include first and second interactive portions corresponding to respective first and second advertisements. The user can select one of the first interactive portion and the second interactive portion corresponding to one of the first advertisement and the second advertisement. The selection can be received by the data processing hardware, and the demographic of the user can be inferred based on the selection.

20 Claims, 10 Drawing Sheets

(56) References Cited

U.S. PATENT DOCUMENTS

| | | |
|---|---|---|
| 10,897,657 B2 * | 1/2021 | Smith .............. H04N 21/44222 |
| 2002/0087402 A1 | 7/2002 | Zustak et al. |
| 2005/0137958 A1 | 6/2005 | Huber et al. |
| 2010/0235241 A1 | 9/2010 | Wang et al. |
| 2014/0237498 A1 | 8/2014 | Ivins |
| 2014/0250449 A1 | 9/2014 | Ramaswamy |
| 2014/0359656 A1 | 12/2014 | Banica et al. |
| 2015/0294358 A1 | 10/2015 | Galadar et al. |
| 2017/0034576 A1 | 2/2017 | Eyer et al. |
| 2017/0085934 A1 | 3/2017 | Evans et al. |

* cited by examiner

| Advertiser: | The Advertiser |
|---|---|
| Code: | XYZ123456A |
| Title: | Advertisement A |
| Category: | Health and Beauty |
| Description: | This is an advertisement depicting The Advertiser's Product A. |
| Length: | 00:30 |

| Demographic Category | Demographic Classification |
|---|---|
| Target Gender: | Male |
| Target Age: | 18–65 |
| Target Race: | All |
| Target Income: | > $40,000 |

358, 358b
366, 366a

| Advertiser: | The Advertiser |
|---|---|
| Code: | XYZ123456B |
| Title: | Advertisement B |
| Category: | Health and Beauty |
| Description: | This is an advertisement depicting The Advertiser's Product B. |
| Length: | 00:30 |

| Demographic Category | Demographic Classification |
|---|---|
| Target Gender: | Female |
| Target Age: | 18–65 |
| Target Race: | All |
| Target Income: | > $40,000 |

358, 358c

| Advertiser: | The Advertiser |
| Code: | XYZ123456E |
| Title: | Advertisement E |
| Category: | Household |
| Description: | This is an advertisement depicting The Advertiser's Product E. |
| Length: | 00:30 |
| Demographic Category | Demographic Classification |
| Target Gender: | Male |
| Target Age: | 32-54 |
| Target Race: | All |
| Target Income: | > $40,000 |

358, 358d  
366, 366b

| Advertiser: | The Advertiser |
| Code: | XYZ123456F |
| Title: | Advertisement F |
| Category: | Household |
| Description: | This is an advertisement depicting The Advertiser's Product F. |
| Length: | 00:30 |
| Demographic Category | Demographic Classification |
| Target Gender: | Female |
| Target Age: | 32-54 |
| Target Race: | All |
| Target Income: | > $40,000 |

FIG. 3E

OBTAINING VIEWER DEMOGRAPHICS THROUGH ADVERTISEMENT SELECTIONS

RELATED DISCLOSURES

This application is a continuation of, and claims priority to, U.S. patent application Ser. No. 16/366,790 filed Mar. 27, 2019, which is a continuation of, and claims priority to, U.S. patent application Ser. No. 15/725,260 filed Oct. 4, 2017, both of which are hereby incorporated by reference herein in their entirety.

TECHNICAL FIELD

This disclosure relates to inferring viewer demographics based on advertisement choice.

BACKGROUND

Media devices today are becoming more and more common and may range from fixtures in a home, such as a television, to mobile devices traveling along with a media consumer. Media devices, such as televisions, set-top boxes, mobile phones, laptops, and tablets, may access and may retrieve media content from a variety of sources. For example, a media device may receive media content via satellite, over-the-air broadcasting, or streaming systems from a wired or a wireless connection. As the use of media devices continues to increase, media device connectivity to media content has also increased. With this growth, new media content markets have emerged and old media content market have adapted to understand and to provide contextually-relevant media content to the media consumer.

SUMMARY

A system and method include operations and steps for inferring a demographic of a user based on a selection of an advertisement by the user. A media device stream is received from a media device by data processing hardware. The data processing hardware may identify frames of the media device stream for insertion of an overlay. The overlay can include first and second interactive portions corresponding to respective first and second advertisements. The user can select one of the first interactive portion and the second interactive portion corresponding to one of the first advertisement and the second advertisement. The selection can be received by the data processing hardware, where the demographic of the user can be inferred.

One aspect of the disclosure provides a method. The method may include receiving, at data processing hardware, a media device stream from a corresponding media device. The data processing hardware may identify media device frames of the media device stream for insertion of an overlay comprising first and second advertisements. The data processing hardware inserts the overlay into the identified media device frames. The overlay comprises a first interactive portion corresponding to the first advertisement and a second interactive portion corresponding to the second advertisement. The data processing hardware receives an advertisement selection indicating a selection by a user of the media device of one of the first interactive portion of the overlay, which corresponds to the first advertisement, or the second interactive portion of the overlay, which corresponds to the second advertisement. The data processing hardware infers a demographic of the user based on the advertisement selection of the user.

Implementations of the disclosure may include one or more of the following optional features. For example, the data processing hardware may receive an advertisement selection history of the user, and obtain the first advertisement and/or the second advertisement from an advertisement data sources based on the advertisement selection history.

In some implementations, the data processing hardware may store the advertisement selection of the user in the advertisement data source. The first advertisement may correspond to a first leaf node of a binary tree, and the second advertisement may correspond to a second leaf node of the binary tree. The second leaf node may share a common parent node with the first leaf node. The binary tree may comprise a plurality of leaf nodes, whereby each leaf node has a corresponding advertisement, and each advertisement has a corresponding demographic. The common parent node corresponds to an advertisement associated with a previous advertisement selection of the user.

In some examples, the first advertisement corresponds to a first demographic classification within a first demographic category, and the second advertisement corresponds to a second demographic classification within a second demographic category.

In some implementations, the data processing hardware receives an overlay trigger prompting the insertion of the overlay into the media device stream.

In some examples, the step of identifying the media device frames of the media device stream may include receiving, at the data processing hardware, broadcast fingerprints indicative of broadcast frames of a broadcast media stream. The data processing hardware may receive media device fingerprints indicative of media device frames of the media device stream at the corresponding media device, and determine a frame match between the media device frames of the media device stream relative to the broadcast frames of the broadcast media stream. At least some of the broadcast frames and/or the media device frames may correspond to advertisement frames.

In some implementations, inferring the demographic of the user comprises comparing a user profile certainty with a user profile certainty threshold.

Another aspect of the disclosure provides a system including data processing hardware and memory hardware. The memory hardware is in communication with the data processing hardware, and stores instructions that, when executed on the data processing hardware, cause the data processing hardware to perform operations. One of the operations may include receiving a media device stream from a corresponding media device. Another operation can include identifying media device frames of the media device stream for insertion of an overlay comprising first and second advertisements. Yet another operation can include inserting the overlay into the identified media device frames, the overlay comprising a first interactive portion corresponding to the first advertisement and a second interactive portion corresponding to the second advertisement. Another operation may include receiving an advertisement selection indicating a selection by a user of the media device of one of the first interactive portion of the overlay, which corresponds to the first advertisement, or the second interactive portion of the overlay, which corresponds to the second advertisement. Yet another operation may include inferring a demographic of the user based on the advertisement selection of the user.

This aspect may include one or more of the following optional features. For example, additional operations performed may include receiving an advertisement selection history of the user, and obtaining the first advertisement and/or the second advertisement from an advertisement data source based on the advertisement selection history. The operations may also include storing the advertisement selection of the user in the advertisement data source. The first advertisement may correspond to a first leaf node of a binary tree and the second advertisement may correspond to a second leaf node of the binary tree. The second leaf node may share a common parent node with the first leaf node. The binary tree may comprise a plurality of the leaf nodes, whereby each leaf node has a corresponding advertisement, and each advertisement having a corresponding demographic. The common parent node may correspond to an advertisement associated with a previous advertisement selection of the user.

In some implementations, the operations may further comprise receiving an overlay trigger prompting the insertion of the overlay into the media device stream.

In some examples, the operation of identifying the media device frames of the media device stream may include receiving, at the data processing hardware, broadcast fingerprints indicative of broadcast frames of a broadcast media stream. The data processing hardware may receive media device fingerprints indicative of media device frames of the media device stream at the corresponding media device, and determine a frame match between the media device frames of the media device stream relative to the broadcast frames of the broadcast media stream. At least some of the broadcast frames and/or the media device frames may correspond to advertisement frames.

In other examples, at least some of the broadcast frames and/or the media device frames may correspond to advertisement frames.

In other implementations, the operation of inferring the demographic of the user may comprise comparing a user profile certainty with a user profile certainty threshold.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3C is a schematic view of a first example advertisement and a second example advertisement.

FIG. 3E is a schematic view of a third example advertisement and a fourth example advertisement.

Like reference symbols in the various drawings indicate like elements.

DETAILED DESCRIPTION

Generally, automatic content recognition (ACR) is the process of identifying media content on a media device or within a media file. ACR has become increasingly useful to identify vast amounts of media content consumed by society every day. From a commercial perspective, ACR may allow businesses and other entities to understand media content consumption and, perhaps more effectively, to market or to target consumers (i.e. media device users) of the media content. For example, an advertisement or an offer is likely more effective when the advertisement is personalized to the user of a media device. Accordingly, broadcasters, commercial providers, advertisers and other entities want to know what programs are being viewed or, more particularly, where the user is in the program during viewing. With this type of information, the media device user may receive more precisely catered media content.

Figure 1A:
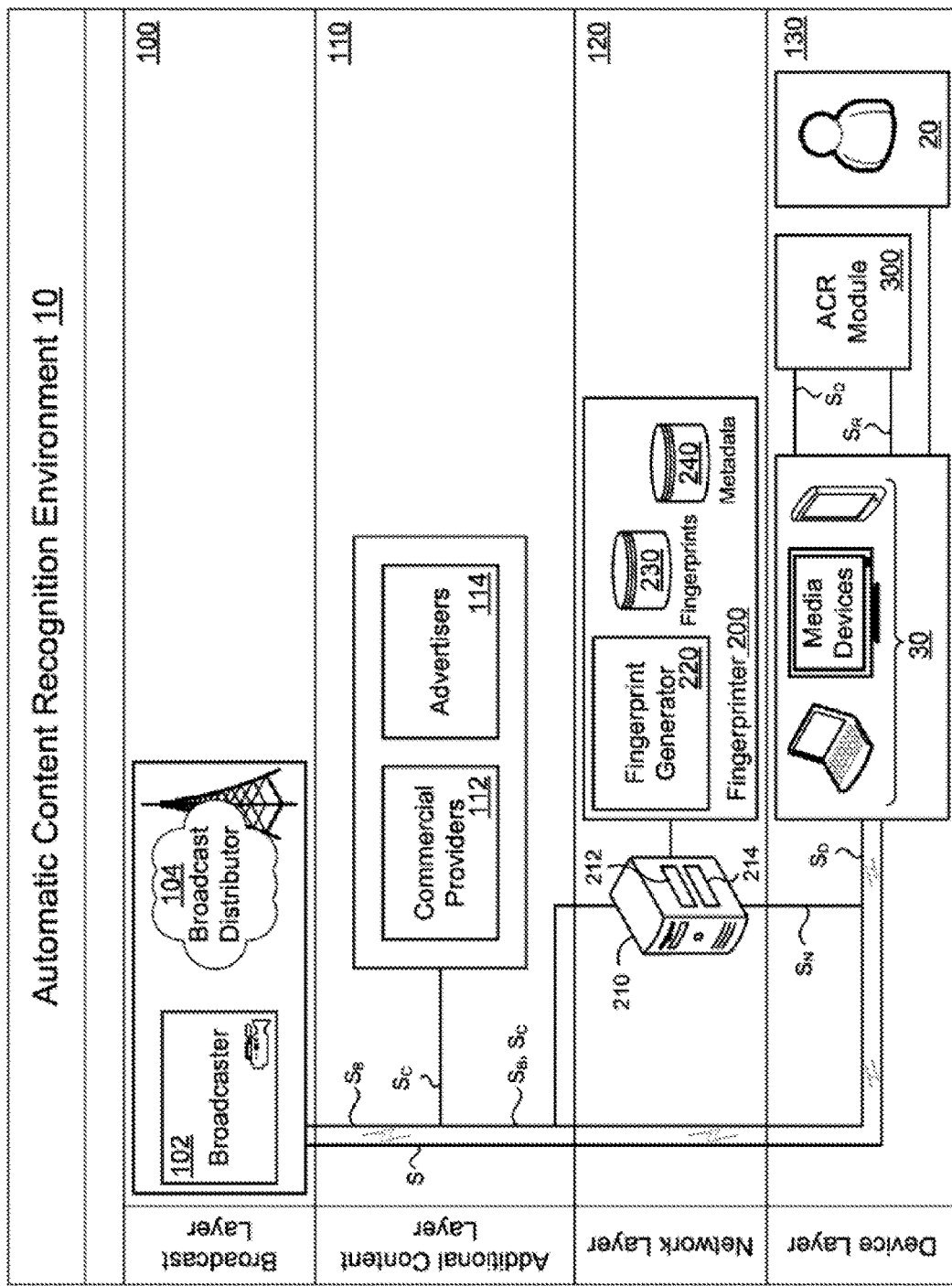
FIG. 1A is a schematic view of an example of an automatic content recognition environment.

FIG. 1A is an example of an automatic content recognition (ACR) environment 10. The ACR environment 10 may include several layers to distribute media content to a user 20 (i.e., a viewer) of a media device 30. FIG. 1A attempts to simplify the media content distribution process into four layers: a broadcast layer 100; an additional content layer 110; a network layer 120; and a device layer 130. Each layer 100, 110, 120, 130 may have entities that influence a media stream S. The broadcast layer 100 represents broadcast entities that may be involved in producing a broadcast media stream $S_B$. These broadcast entities may include a broadcaster 102 and a broadcast distributor 104. The broadcaster 102 may be one or more media content providers, such as local broadcasters, multi-channel networks, or other media content owners. The broadcast distributor 104 is a broadcast entity that provides infrastructure or resources (e.g., signal wires, communication towers, communication antennas, servers, etc.) to distribute media content. The broadcaster 102 and the broadcast distributor 104 may be the same broadcast entity or a different broadcast entity depending on broadcasting variables, such as a type of media content being provided or a type of media device receiving the media content.

In some implementations, the media stream S includes an additional media content stream $S_C$ from content entities represented as the additional content layer 110. These content entities include commercial providers 112, advertisers 114, or other entities contributing additional media content to the media stream S. Generally, commercial providers 112 are content entities that procure and/or host the additional media content stream $S_C$, while advertisers 114 are content entities that generate the additional media content stream $S_C$, such as advertisements, offers, deals, discounts, benefits, or other promotions of goods and/or services. Additionally or alternatively, the commercial providers 112 and the advertisers 114 may be the same content entity. The additional content layer 110 may communicate the additional media content stream $S_C$ to the broadcast layer 100, the network layer 120, the device layer 130, or any combination thereof. Optionally, the additional content layer 110 may pair the additional media content stream $S_C$ with the broadcast media stream $S_B$ to form the media stream S that includes the broadcast media stream $S_B$ and the additional media content stream $S_C$.

Referring further to FIG. 1A, the network layer 120 is configured to receive the broadcast media stream $S_B$ and the additional media content stream $S_C$ from the broadcast layer 100 and/or the additional content layer 110. For example, if the network layer 120 receives the media stream S from the broadcast layer 100, the network layer 120 may receive the broadcast media stream $S_B$ with the additional media content $S_C$ or independent of the additional media content stream $S_C$. Similarly, if the network layer 120 receives the media stream S from the additional content layer 110, the network layer 120 may receive the broadcast media stream $S_B$ with the additional media content stream $S_C$ or independent of the additional media content stream $S_C$. In some implementations, the network layer 120 may pair the broadcast media stream $S_B$ from the broadcast layer 100 with the additional media content stream $S_C$ from the additional content layer 110 to generate a network media stream $S_N$ representing the broadcast media stream $S_B$ impregnated with the additional media content stream $S_C$.

The network layer 120 includes a fingerprinter 200. The fingerprinter 200 is configured to operate on a server 210 having data processing hardware 212 and memory hardware 214. The fingerprinter 200 includes a broadcast fingerprint generator 220. The network layer 120 may be configured to store fingerprints 222 and metadata related to the fingerprints 222 in a fingerprint database 230 and/or a metadata database 240. Generally, a fingerprint 222 is at least one unique identifier corresponding to at least one frame $F_n$ of the media stream S. For example, the at least one unique identifier may be a value (e.g., pixel value), an alphanumeric representation, or a compressed version of the audio visual image. Additionally or alternatively, the network layer 120 is configured to store the broadcast media stream $S_B$, the additional media content stream $S_C$, or both.

The device layer 130 includes one or more media devices 30 and an automatic content recognition (ACR) module 300. The ACR module 300 may be an internal device to the television 30, 30a (e.g., hardware or software of the television 30, 30a) or an external device in communication with the television 30, 30a (e.g., a headend system or a set top box). The media devices 30, such as televisions, PCs, laptops, tablets, or mobile phones, receive a media device stream $S_D$ (e.g., any combination of the broadcast media stream $S_B$, the additional content stream $S_C$, or the network media stream $S_N$) and may convey all or a portion of the corresponding media device stream $S_D$ to a user 20.

A device may mean any hardware or any software related to a media device 30 configured to receive or to communicate some form of media content. In some implementations, the media devices 30 and more specifically, the ACR module 300, may be configured to interpret or to interact with the corresponding media stream S (e.g., any combination of the broadcast media stream $S_B$, the additional content stream $S_C$, or the network media stream $S_N$). For example, the ACR module 300 identifies the additional media content stream $S_C$ from the broadcast media stream $S_B$. The ACR module 300 may substitute or overlay the additional media content stream $S_C$ of the media device stream $S_D$ with a replacement media content stream $S_R$. The ACR module 300 may filter the media device stream $S_D$ for predefined content. Additionally or alternatively, the media devices 30 and the ACR module 300 may be configured to communicate information or data related to the media device stream $S_D$ with the broadcast layer 100, the additional content layer 110, the network layer 120, or other media devices 30 of the device layer 130.

Figure 1B:
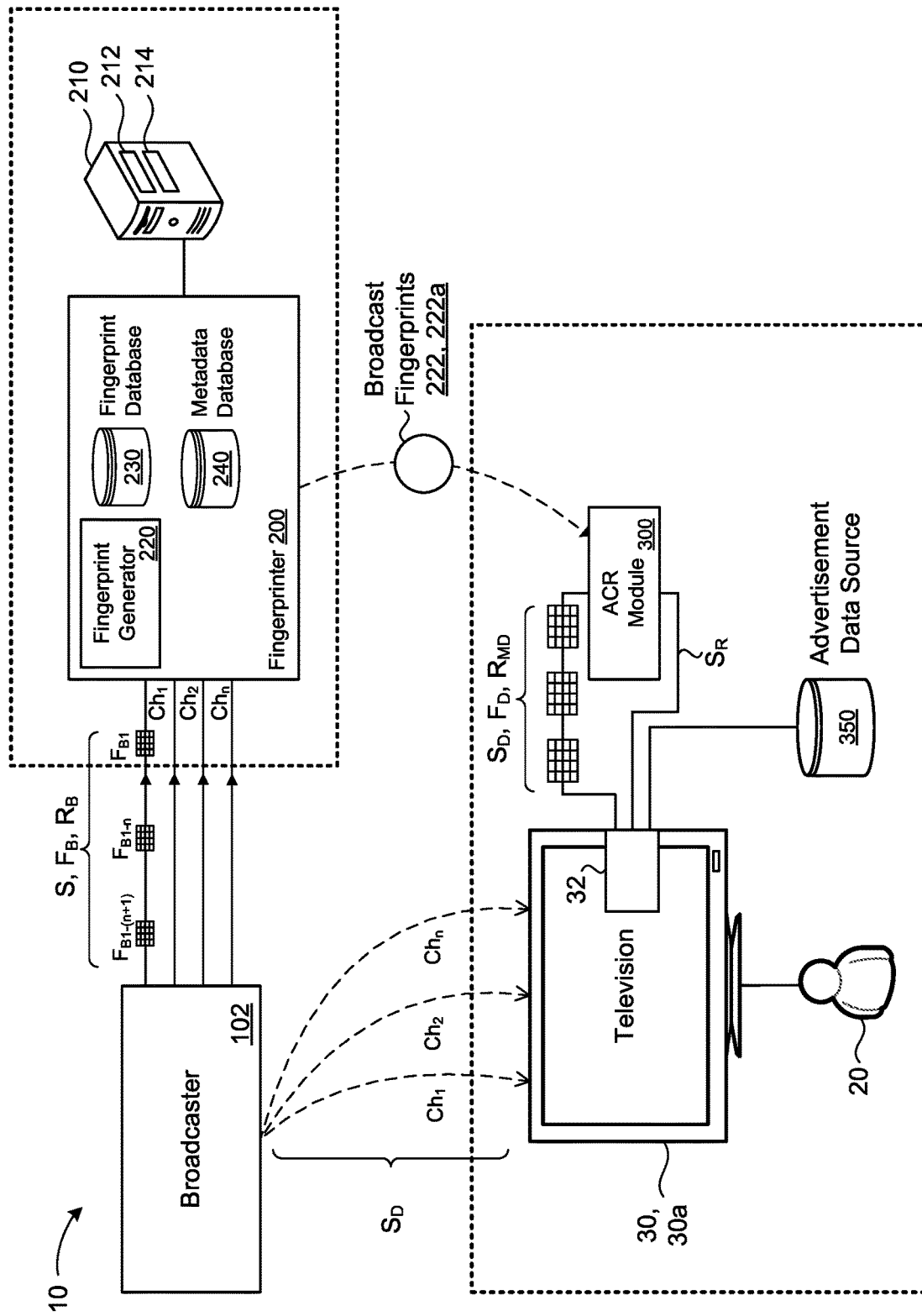
FIG. 1B is a schematic view of an example of an automatic content recognition environment.

FIG. 1B is an example of the ACR environment 10. The ACR environment 10 includes the broadcaster 102, the fingerprinter 200, the media device 30, the ACR module 300, and an advertisement data source 350. The broadcaster 102 broadcasts the media stream S by channels $Ch_{1-n}$ to the fingerprinter 200 at a broadcast frame rate $R_B$. The broadcast frame rate $R_B$ divides the media stream S into broadcast frames $F_B$ such that each broadcast frame $F_B$ corresponds to an audio visual image represented by pixels within the media stream S. The fingerprinter 200 is configured to receive each broadcast frame $F_B$ at the broadcast fingerprint generator 220. The broadcast fingerprint generator 220 receives each broadcast frame $F_B$ and is configured to generate broadcast fingerprints 222, 222a indicative of each broadcast frame $F_B$. Generally, as mentioned earlier, a broadcast fingerprint 222, 222a is at least one unique identifier corresponding to at least one broadcast frame $F_B$. The fingerprinter 200 may store each broadcast fingerprint 222, 222a in a database, such as the fingerprint database 230. In some examples, the fingerprinter 200 stores each broadcast fingerprint 222, 222a according to or along with metadata corresponding to the broadcast frame $F_B$, such as a frame location $F_{B1-n}$ (e.g., a frame time code), a type of frame (e.g., live program or advertisement), or a fingerprint identifier tag. In other examples, the fingerprinter 200 has one or more separate metadata databases 240 corresponding to the metadata of each broadcast fingerprints 222, 222a. The separate metadata database 240 for metadata may allow the fingerprinter 200 to store more broadcast fingerprints 222, 222a.

Referring further to FIG. 1B, the media device 30 receives the media stream S from the broadcaster 102 as a media device stream $S_D$. The media device 30 is configured to capture media frames $F_D$ from the media device stream $S_D$ and to communicate the captured media frames $F_D$ to the ACR module 300. In the example shown in FIG. 1B, the media device 30 is a television 30, 30a (TV) that receives the media device stream $S_D$. For example, the television 30, 30a receives television channels $Ch_{1-n}$ as the media device stream $S_D$.

In some implementations, the broadcaster 102 provides the media stream S at the broadcast frame rate $R_B$. Often, the broadcast frame rate $R_B$ corresponds to various industry standards of a broadcast format (e.g., 1080 60i, 720 60P, etc.). For example, some common broadcast frame rates $R_B$ include 30P (29.97 frames per second), 24P, (23.98 frames per second), and 60P (59.94 frames per second). The television 30, 30a may be configured to capture frames $F_D$ of the media device stream $S_D$ at a media device frame rate $R_{MD}$. The media device frame rate $R_{MD}$ is the frame rate at which a corresponding television 30, 30a provides captured frames $F_D$ to the ACR module 300. In some implementations, the television 30, 30a is configured to receive the media device stream $S_D$ at the broadcast frame rate $R_B$, but yet be configured to capture frames $F_D$ of the media device stream $S_D$ at a media device frame rate $R_{MD}$ for the ACR module 300. For example, the broadcast frame rate $R_B$ is different than the media device frame rate $R_{MD}$. An example of this difference is that the broadcast frame rate $R_B$ is greater than the media device frame rate $R_{MD}$ (e.g., a broadcast frame rate of 30P and a media device frame rate $R_{MD}$ of 4 frames per second). The difference in frame rates may be resource limitations (processor, memory, etc.) relating to frame capturing hardware or software at the television 30, 30a.

In some examples, the ACR module 300 receives broadcast fingerprints 222, 222a from the fingerprinter 200 and the media device frames $F_D$ from the media device stream $S_D$. The ACR module 300 may compare the media device frames $F_D$ to the broadcast frames $F_B$ to identify matching frames $F_{Bn1}$, $F_{Dn}$ so that a replacement media content stream $S_R$ can be substituted for the media device stream $S_D$.

Figure 2:
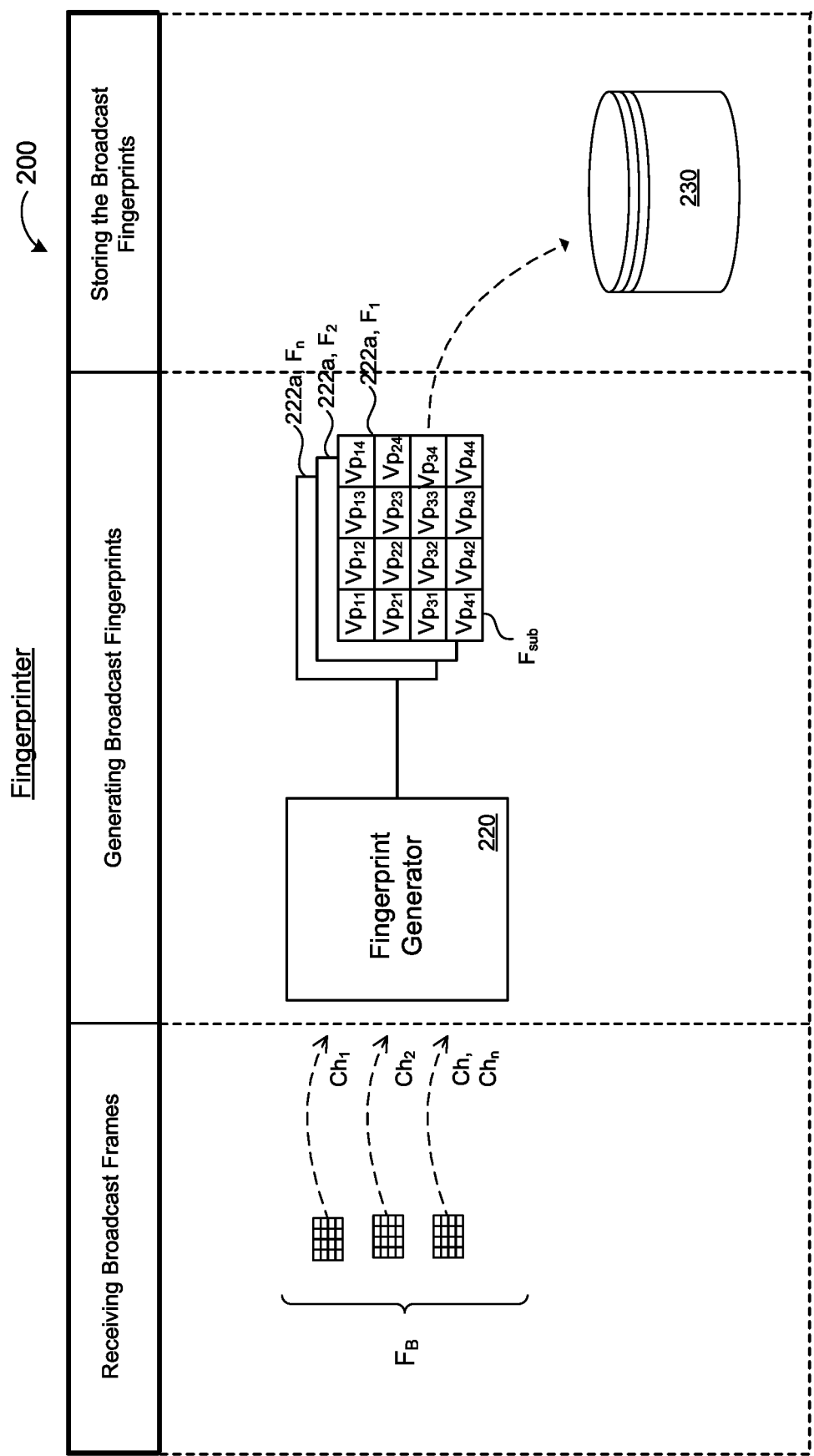
FIG. 2 is a schematic view of an example server of the automatic content recognition environment.

FIG. 2 illustrates example operations of the broadcast fingerprint generator 220 of the fingerprinter 200. The broadcast fingerprint generator 220 receives the broadcast frames $F_B$ corresponding to channels $Ch_{1-n}$ of the media stream S. The broadcast fingerprint generator 220 may generate a broadcast fingerprint 222, 222a for each received broadcast frame $F_B$ and may store the broadcast fingerprint 222, 222a in the fingerprint database 230. In some examples, each broadcast fingerprint 222, 222a represents at least one pixel value $V_P$ of the broadcast frame $F_B$ of the corresponding media stream S. The at least one pixel value $V_P$ may be an average pixel value or a sum of color space values of the broadcast frame $F_B$. For example, the at least one pixel value $V_P$ may represent a sum and/or average of grayscale values of a corresponding broadcast frame $F_B$ when the broadcast fingerprint generator 220 generates a broadcast fingerprint 222, 222a according to a gray-UV (YUV) color space. In other words, each pixel of the corresponding broadcast frame $F_B$ is represented by a grayscale value such that the broadcast fingerprint 222, 222a represents the sum and/or average of the grayscale values of a pixel area. In some implementations, the fingerprint 222 (e.g., the broadcast fingerprint 222, 222a) is a unique identifier based on sub-frames $F_{sub}$ of the corresponding broadcast frame $F_B$. Depending on the pixels per sub-frame $F_{sub}$, each sub-frame $F_{sub}$ may have a corresponding pixel value $V_p$ or a corresponding average pixel value.

FIG. 2 also illustrates an example of a broadcast fingerprint 222a, $F_{1-n}$ corresponding to a broadcast frame $F_B$ divided into sub-frames $F_{sub}$. In some examples, the broadcast fingerprint generator 220 divides each broadcast frame $F_B$ into sub-frames $F_{sub}$ to more accurately compare or to distinguish between broadcast frames $F_B$. With sub-frames $F_{sub}$, each fingerprint 222 may represent more than one average pixel value $V_p$ of the corresponding frame $F_B$. By dividing each broadcast frame $F_B$ into sub-frames $F_{sub}$, more details (e.g., pixels of each sub-frame $F_{sub}$) are taken into account during broadcast fingerprint generation than broadcast fingerprints 222, 222a based on a pixel value $V_P$ (or average pixel value) of an entire broadcast frame $F_B$. As such, the number of sub-frames $F_{sub}$ that the broadcast fingerprint generator 220 divides each broadcast frame $F_B$ into depends on a desired level of accuracy. For example, as shown in FIG. 2, the broadcast fingerprint generator 220 divides each broadcast frame $F_B$ into sixteen sub-frames $F_{sub}$ defining a four by four array. Each sub-frame $F_{sub}$ of the sixteen sub-frames $F_{sub}$ has an average pixel value $V_{p11-44}$ such that each broadcast fingerprint 222, 222a represents each corresponding broadcast frame $F_B$ by a sixteen value integer vector having an integer value associated with each sub-frame $F_{sub}$. Although the figures may depict each broadcast frame $F_B$ or each media device frame $F_D$ as a four by four array, any sub-frame division is possible.

Figure 3A:
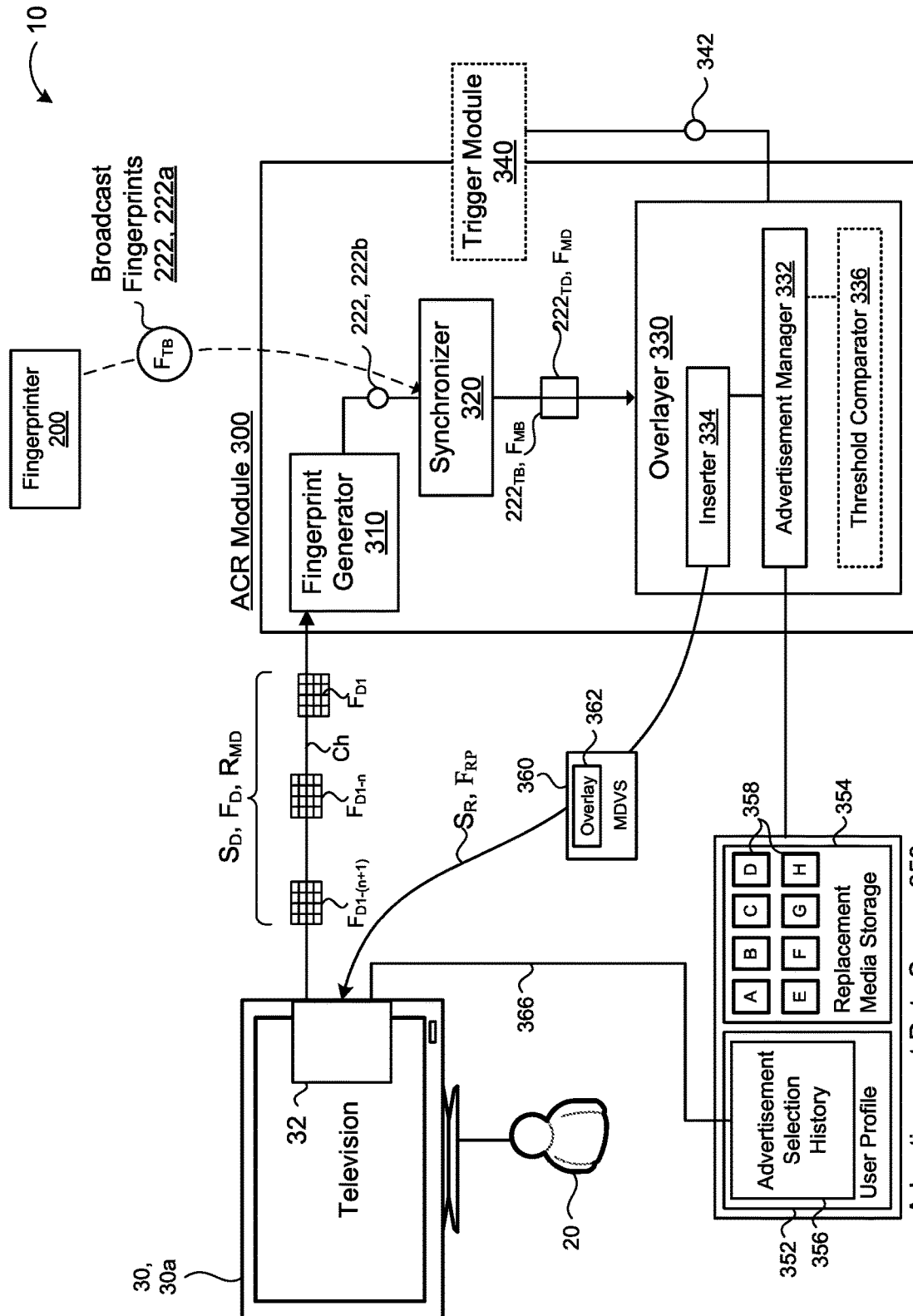
FIG. 3A is a schematic view of an example of an automatic content recognition environment.

FIG. 3A shows an example of the ACR environment 10, detailing a relationship between the television 30, 30a, the fingerprinter 200, the ACR module 300, and the advertisement data source 350. As discussed above, the television 30, 30a may be configured to receive and convey all or a portion of the media device stream $S_D$ and the replacement media content stream $S_R$. The television 30, 30a may include a content manager 32 configured to communicate with the ACR module 300 and/or the advertisement data source 350. The content manager 32 may be an internal device to the television 30, 30a (e.g., hardware or software of the television 30, 30a) or an external device in communication with the television 30, 30a (e.g., a headend system or a set top box). The content manager 32 can be a server component that receives the replacement media content stream $S_R$ from the ACR module 300, displays the replacement media content stream $S_R$ on the television 30, 30a, and records an impression or association between the replacement media content stream $S_R$ and the user 20 in the advertisement data source 350, as discussed further herein.

The ACR module 300 is configured to determine a frame match between the media device frames $F_D$ of a media device stream $S_D$ relative to the broadcast frames $F_B$ of a broadcast media stream $S_B$, $S_C$. In some examples, the ACR module 300 includes a fingerprint generator 310 and a synchronizer 320. The fingerprint generator 310 functions similar to the broadcast fingerprint generator 220, except that the fingerprint generator 310 of the ACR module 300 generates fingerprints 222 (i.e., media device fingerprints 222, 222b) corresponding to media device frames $F_D$ captured at a media device 30 (e.g., the TV 30, 30a). The fingerprint generator 310 is configured to communicate the media device fingerprints 222, 222b to the synchronizer 320.

In some implementations, the synchronizer 320 receives the media device fingerprints 222, 222b and the broadcast fingerprints 222, 222a from the fingerprinter 200. With the media device fingerprints 222, 222b and the broadcast fingerprints 222, 222a, the synchronizer 320 identifies the frame match. The frame match is a broadcast frame $F_B$ that matches a given media device frame $F_D$. Additionally or alternatively, the broadcast frame $F_B$ that corresponds to the frame match is also referred to as a matching broadcast frame $F_{MB}$, while the media device frame $F_D$ corresponding to the frame match is referred to as the matched media device frame $F_{MB}$. The ACR module 300 may identify parameters of the media content at the media device stream $S_D$ based on the matching broadcast frame $F_{MB}$. For example, with the frame match, the ACR module 300 may identify metadata from the matching broadcast frame $F_{MB}$. The metadata may include a frame location (e.g., frame time code), a type of frame (e.g., live program or advertisement), a channel corresponding to the matching broadcast frame $F_{MB}$, an identifier tag, or any descriptor related to the matching broadcast frame $F_{MB}$. The ACR module 300 may associate the metadata from the matching broadcast frame $F_{MB}$ with the matched media device frame $F_{MD}$ of the frame match. In some examples, the ACR module 300 associates metadata regarding a channel Ch corresponding to the media device frame $F_D$ and/or a media device frame location $F_{D1-n}$ within the channel Ch (e.g., a frame time code).

With knowledge of the channel Ch and the position of the media device stream $S_D$ at the media device 30, broadcasters 102 and additional content providers 112, 114 may know what program a user 20 is watching and where the user 20 is in the sequence of the program. The broadcaster 102 and the additional content providers 112, 114 may then use such information to accurately target the user 20 for advertisements and offers or provide non-commercial information to the user 20 (e.g., news alerts, announcements, educational information, etc.). Thus, the ACR module 300 may allow an entity to coordinate media content provided to the user 20 during use of a media device 30.

A potential problem with the frame match process at the ACR module 300 is that consecutive media device frames $F_D$ may be very similar, such that consecutive media device frames $F_D$ only have slight changes over time unless a scene change occurs drastically changing consecutive media device frames $F_D$. Due to only slight changes between consecutive media device frames $F_D$, the ACR module 300 may be at risk of falsely identifying a frame match. In other words, when the ACR module 300 determines that the media device stream $S_D$ is being viewed by the user 20 at one media device frame $F_{D1}$ (a matched media device frame $F_{MD}$), the user 20 is actually viewing media content from the media device stream $S_D$ a few media device frames $F_D$ ahead of or behind the matched media device frame $F_{MD}$.

To address the potential of a matching error, the ACR module 300 is configured to determine a frame certainty metric as an indicator of whether the frame match corresponds to a media device frame $F_D$ that best matches the matching broadcast frame $F_{MB}$. In other words, the ACR module 300 may determine that the frame match should shift to a different media device frame $F_D$ than the original match media device frame $F_{MD}$.

The ACR module 300 may further include an overlayer 330 having an advertisement manager 332 and an inserter 334. Generally, the overlayer 330 may identify media device frames $F_D$ representing advertisements or flagged content within the media device stream $S_D$ and may replace (or overlay) the media device frames $F_D$ of media device stream $S_D$ with replacement frames $F_{RP}$ of the replacement media content stream $S_R$, including replacement advertisements 358. More specifically, the replacement media content stream $S_R$ may include an overlay 362 provided to the television 30, 30a. In some examples, the overlay 362 is provided to the television 30, 30a over top of a media device video stream 360 of the media device stream $S_D$, whereby the replacement frames $F_{RP}$ including the overlay 362 are provided simultaneously with the media device stream $S_D$. The overlay 362 may be provided as an interactive overlay 362. The interactive overlay 362 solicits feedback from the user 20, and an impression or response from the user 20 can be received and recorded by the content manager 32.

The advertisement manager 332 may be configured to choose one or more advertisements from the advertisement data source 350 to be provided as the replacement media content stream $S_R$, as discussed further, below. The advertisements 358 chosen by the advertisement manager 332 may be formatted by the advertisement manager 332 to be included within the overlay 362.

The inserter 334 is in communication with the advertisement manager 332 and the media device 30, and is configured to substitute or overlay the media device stream $S_D$ with the replacement media content stream $S_R$ including the advertisements 358 identified by the advertisement manager 332. The inserter 334 may use information communicated from the synchronizer 320 to identify a media device frame $F_D$ corresponding to an advertisement 358 within the media device stream $S_D$. For example, as the synchronizer 320 identifies a target media device fingerprint 222, $222_{TD}$ matching a target broadcast fingerprint 222, $222_{TB}$, the synchronizer 320 communicates the target media device fingerprint 222, $222_{TD}$ or the media device frame $F_D$ corresponding to the target media device fingerprint 222, $222_{TD}$ to the inserter 334. In some examples, the synchronizer 320 communicates metadata (e.g., a frame location $F_{D1-n}$) associated with the media device frame $F_D$ corresponding to the target media device fingerprint 222, $222_{TD}$ such that the inserter 334 may align a set of the replacement frames $F_{RP}$ of the replacement media content stream $S_R$ with media device frames $F_D$ to be replaced. Specifically, the inserter 334 may align a set of replacement frames $F_{RP}$ including the overlay 362 with media device frames $F_D$ corresponding to the additional media content stream $S_C$ (i.e., advertisements). Additionally or alternatively, the inserter 334 may align a set of replacement frames $F_{RP}$ including the overlay 362 with media device frames $F_D$ corresponding to the broadcast media stream $S_B$, such as a television or movie broadcast, whereby the overlay 362 is displayed to the user 20 in advance of the additional media content stream $S_C$.

The overlayer 330 may further include a threshold comparator 336. The threshold comparator 336 minimizes iterations of user profile development performed by the ACR environment 10 by determining when a user profile certainty satisfies a predetermined threshold. By minimizing the iterations, the ACR environment 10 may process more quickly and rely on less processing power. The threshold comparator 336 may be configured with a user profile certainty threshold to be compared to a user profile certainty after each iteration. With the user profile certainty threshold, the ACR module 300 does not have to continue developing the user profile indefinitely. For example, if the user profile certainty satisfies the user profile certainty threshold, the advertisement manager 332 discontinues the user profile development and stores the user profile 352 in the advertisement data source 350 for future use.

The ACR module 300 may include a trigger module 340 configured to prompt the ACR module 300 to insert the overlay 362 into the media device stream $S_D$ based on the occurrence of a predetermined event. For example, the user 20 may flag specific media device frames $F_D$ that he/she does not want to be displayed, such as media device frames $F_D$ including graphic or irrelevant media content. When the ACR module 300 recognizes that the flagged media device frames $F_D$ are going to be displayed, the trigger module 340 sends a trigger 342 to the overlayer 330, prompting the overlayer 330 to provide the replacement media content stream $S_R$ in place of the media device stream $S_D$. The ACR module 300 may identify media device frames $F_D$ based on the metadata provided with the broadcast frames $F_B$.

In some examples, the media device 30 and the ACR module 300 can be coupled to the advertisement data source 350. The advertisement data source 350 can store one or more of the user profiles 352, which may include associated advertisement selection histories 356 based on the impressions received from the content manager 32. The advertisement data source 350 may include a replacement media storage 354 configured to store replacement media content, such as advertisements 358, to be included in the replacement media content stream $S_R$. Although the replacement media content is generally discussed as including advertisements 358, the replacement media content may include any type of media content. Alternatively, the replacement media storage 354 may be independent of the advertisement data source 350.

Generally, when the overlayer 330 determines that the media device stream $S_D$ should be replaced or overlaid with the replacement media content stream $S_R$, the advertisement manager 332 may communicate with the content manager 32 to identify a user profile 352 associated with the media device stream $S_D$, so that the replacement media content stream $S_D$ can be tailored to the user 20. The user profile 352 may be identified based on a manual selection of the user profile 352 by the user 20. Alternatively, the user profile 352 may be identified automatically by the content manager 32. For example, the content manager 32 may recognize particular viewing habits associated with a specific user 20. Alternatively or additionally, the media device 30 may rely on geolocation to identify that a known user 20 is likely viewing the media device stream $S_D$. Based on the identified user profile 352, or lack thereof, the advertisement manager 332 of the overlayer 330 can generate and submit a query or search of the replacement media storage 354 for media content to be included in the overlay 362.

Figure 3B:
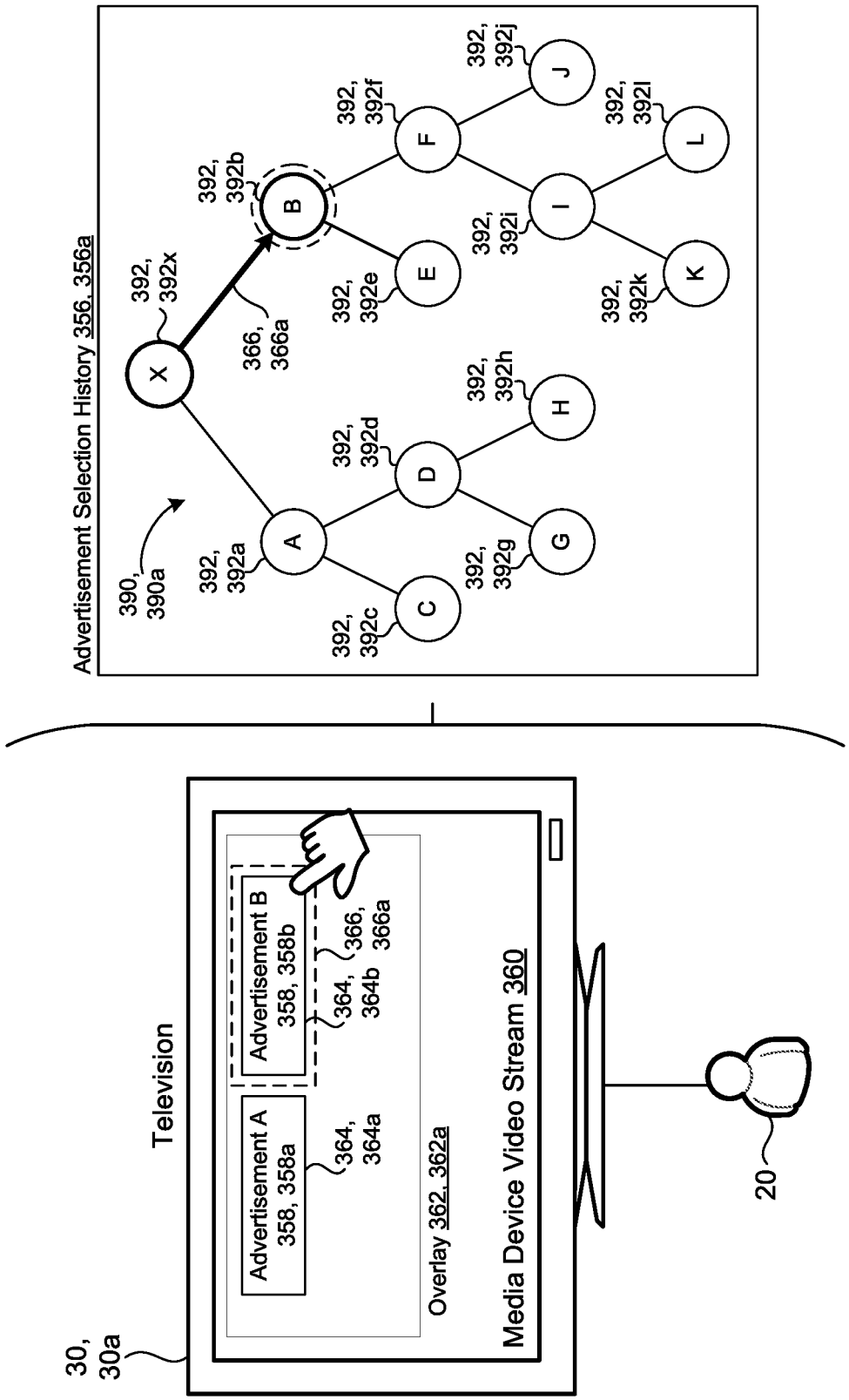
FIG. 3B is a schematic view of an example automatic content recognition module corresponding to a media device.

In some examples, no user profile 532 may be associated with the media device stream $S_D$. When no user profile 532 is associated with the media device stream $S_D$, the content manager 32 executes a first iteration of user profile development, as illustrated in FIGS. 3B and 3C. In additional examples, the user profile 532 may be partially developed, whereby the user profile certainty does not satisfy the user profile certainty threshold, and the user profile 532 requires further development, as illustrated in FIGS. 3B and 3C. In yet further examples, the user profile 532 associated with the media device stream $S_D$ may be fully developed, whereby the user profile certainty satisfies the user profile certainty threshold, and no further development is necessary.

FIGS. 3B-3E illustrate a first iteration and a second iteration of an example method for developing a user profile 352 using the ACR environment 10. In the example shown, a binary tree 900 represents the development of an advertisement selection history 356, 356a of the user profile 352. The binary tree 900 includes a plurality of nodes 392. Each of the nodes 392 represents a potential advertisement 358 to be presented to the user 20 via the overlay 362, and connectors of the nodes 392 represent potential selections 366 by the user 20. As advertisements 358 are iteratively displayed and selected, the binary tree 390 is traversed, the advertisement selection history 356 is developed, and demographics of the associated user 20 may be inferred with increasing certainty. While, in the example shown, a single binary tree 900 is traversed, representing the inference of a single demographic classification within a single demographic category, the implementation of multiple binary trees 900 is possible. The examples of FIGS. 3B-3E illustrate the development of the user profile 352 to infer a gender of the user 20. Accordingly, the advertisement manager 532 identifies and presents each of the advertisements 358 based on a strong correlation between the advertisement 358 and a particular gender. Particularly, in this example, the advertisement manager 332 is configured to always identify and present one advertisement 358a with a strong correlation to male users 20 and another advertisement 358b with a strong correlation to female users 20. In similar implementations, any number of demographic classifications of any number demographic categories may be inferred by the ACR environment 10. Furthermore, one or more binary trees 900 may be traversed to determine any number of demographic categories. For example, in the first iteration, the advertisement manager 332 may identify and insert advertisements 358 based on a gender inference of the user 20, and in the second iteration the advertisement manager 332 may identify and insert advertisements 358 based on an age inference of the user 20. Additionally or alternatively, the ACR environment 10 may traverse multiple binary trees 900 simultaneously to concurrently infer multiple demographic classifications. For example, in the first iteration the advertisement manager 332 may identify and insert a first advertisement 358 having a strong correlation to a first gender and a first age and a second advertisement 358 having a strong correlation to a second gender and a second age. A selection of the first advertisement 358 by the user 20 may lead to the inference that the user 20 can be classified in the first gender and the first age. Successive iterations by the advertisement manager 332 increase a certainty of inferences.

Referring to the example of FIGS. 3B and 3C with continued reference to FIG. 3A, in the first iteration, the advertisement manager 332 initializes the user profile 352, which does not yet include the advertisement selection history 356. Accordingly, the advertisement manager 332 identifies a first advertisement 358, 358a and a second advertisement 358, 358b in the replacement media storage 354 based on predetermined advertisement selection instructions. For example, the advertisement manager 332 may identify the first advertisement 358, 358a, which strongly correlates to a first demographic classification of a first demographic category, and the second advertisement 358, 358b, which strongly correlates to a second demographic classification of the first demographic category. As shown in FIG. 3C, the first advertisement 358, 358a corresponds to Advertisement A for a health and beauty product directed towards males, ages 18-65, and having an income greater than $40,000 per year, while the second advertisement 358, 358b corresponds to Advertisement B for a health and beauty product directed towards females, ages 18-65, and having an income greater than $40,000 per year.

With the first advertisement 358, 358a and the second advertisement 358, 358b identified, the advertisement manager 332 provides the advertisements 358, 358a, 358b to the overlay 362. As shown in FIG. 3B, the first advertisement 358, 358a and the second advertisement 358, 358b may be provided as a first interactive portion 364, 364a and a second interactive portion 364, 364b of the overlay 362. The interactive portions 364 may include a preview or summary of the respective advertisement 358 included therein. For example, the interactive portion 364 may include a thumbnail image, video segment, or a description of the respective advertisement 358 included therein, to communicate the context of the respective advertisement 358 to the user 20.

The inserter 334 communicates the overlay 362, including the interactive portions 364, to the television 30, 30a via the replacement media content stream $S_R$. As introduced above, the inserter 334 may substitute or overlay the portions of the media device stream $S_D$ including the additional media content stream $S_C$, whereby the overlay 362 is only substituted or overlaid for advertisements 358 included in the media device stream $S_D$, and does not overlap with the media content of the broadcast media stream $S_B$. However, the inserter 334 may provide the overlay 362 at a period of time prior to the additional media content stream $S_C$, whereby the overlay 362 is displayed concurrently with the broadcast media stream $S_B$ portion of the media device stream $S_D$. Accordingly, the user 20 may select either of the advertisements 358 in advance of the additional media content stream $S_C$ so that the selected advertisement 358 can be substituted for the additional media content stream $S_C$ without delay or overlap. If the overlay 362 is provided concurrently with the broadcast media stream $S_B$ portion of the media device stream $S_D$, the overlay 362 may be partially transparent so that the broadcast media stream $S_B$ portion of the media device stream $S_D$ is viewable through the overlay 362. Alternatively, the broadcast media stream $S_B$ portion of the media device stream $S_D$ may be reformatted, whereby the broadcast media stream $S_B$ is displayed on a first portion of the television 30, 30a and the overlay 362 is displayed on a second portion of the television 30, 30a.

Once displayed on the television 30, 30a, the interactive portions 364 may be user-selectable, for example, by a touch-sensitive screen or by buttons on a remote control (not shown). For example, the first interactive portion 364, 364a may identify a first button of the remote control, such as a red button, as corresponding to a selection of the first advertisement 358, 358a, while the second interactive portion 364, 364b identifies a second button of the remote control, such as a blue button, as corresponding to a selection of the second advertisement 358, 358b. Alternatively, the interactive portions 364 may be user-selectable by other methods of feedback, such as voice, touch, or gesture.

In the example of FIG. 3B, the second interactive portion 364, 364b including the second advertisement 358, 358b is selected by the user 20, as signified by the hand and the dashed box. The content manager 32 then records the advertisement selection 366, 366a in the advertisement data source 350, and the selection 366, 366a is included in the advertisement selection history 356 of the user profile 352, as shown in FIG. 3A. Referring to the binary tree 390 of FIG. 3B, the advertisement selection history 356, 356a is illustrated as advancing from a root node 392, 392x to a second leaf node 392, 392b representing Advertisement B. Accordingly, the user profile 352 is partially developed, and indicates with a first certainty that the associated user 20 may be a female.

Figure 3D:
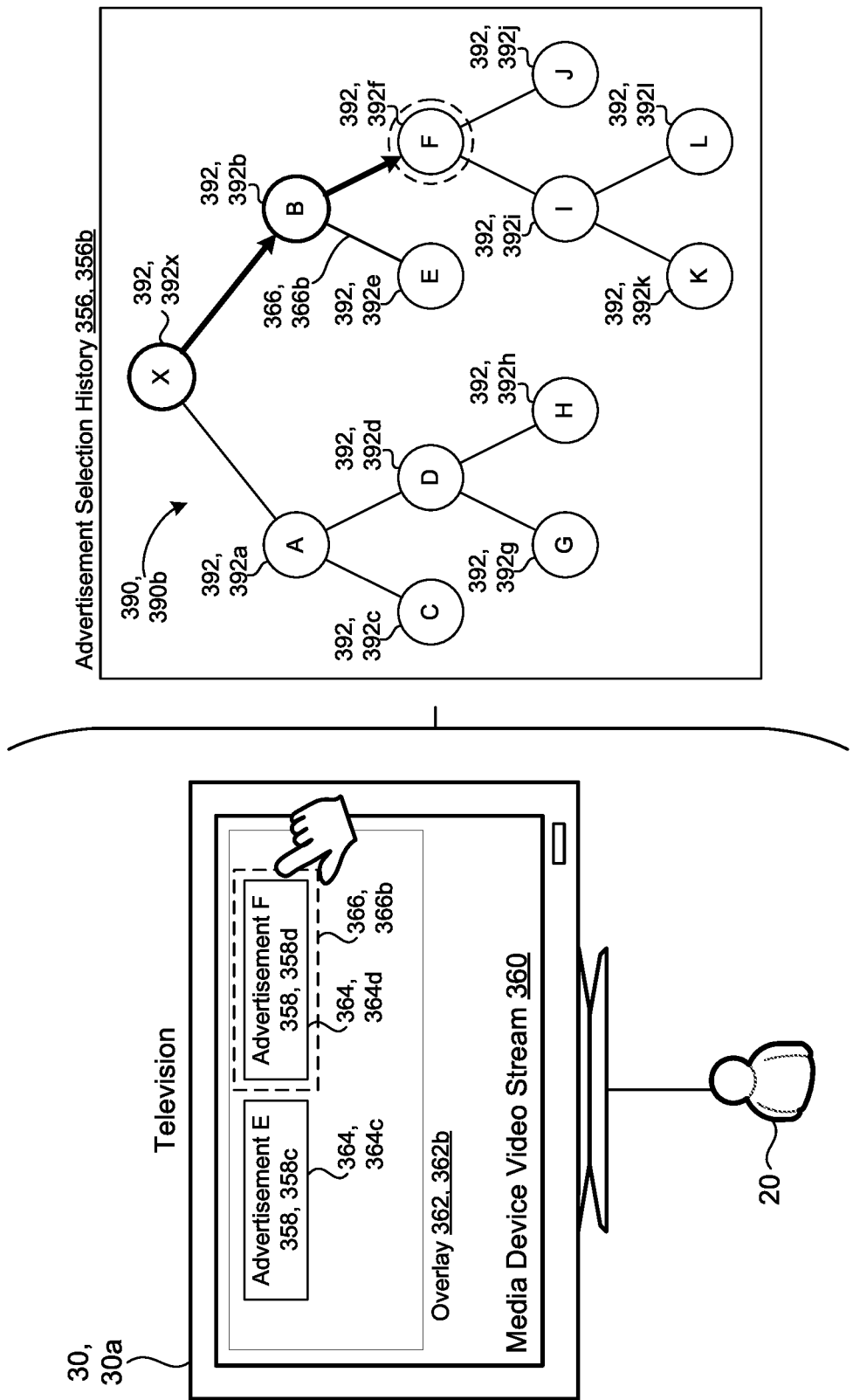
FIG. 3D is a schematic view of an example automatic content recognition module corresponding to a media device.

Referring now to the example of FIGS. 3D and 3E, in the second iteration the user profile 352 has already been partially developed and includes the advertisement selection history 356, 356a created in the example of FIG. 3A. Accordingly, the content manager 32 may associate the user profile 352 with the media device stream $S_D$ so that the advertisement manager 332 can identify and insert advertisements 358 that may be relevant to the associated user 20.

In the second iteration, the advertisement manager 332 queries the advertisement data source 350 for the advertisement selection history 356, 356a corresponding to the user 20 associated with the media device stream $S_D$. The advertisement manager may identify and insert a third advertisement 358, 358c and a fourth advertisement 358, 358d based on the advertisement selection history 356, 356a developed during the first iteration. The third advertisement 358, 358c and the fourth advertisement 358, 358d may be identified and inserted based on a likelihood of increasing the user profile certainty in view of the selection 366, 366a made during the first iteration. For example, as illustrated by the binary tree 390, 390b, because the user 20 selected the second advertisement 358, 358b corresponding to a female user, the advertisement manager 332 identifies and inserts Advertisement E and Advertisement F as the third advertisement 358, 358c and the fourth advertisement 358, 358d, respectively. As shown in FIG. 3E, the third advertisement 358, 358c corresponds to Advertisement E for a household product directed towards males, ages 32-54, and having an income greater than $40,000 per year, while the fourth advertisement 358, 358d corresponds to Advertisement F for a health and beauty product directed towards females, ages 32-54, and having an income greater than $40,000 per year. However, if the user 20 had selected the first advertisement 358, 358a corresponding to a male user in the first iteration, the advertisement manager 332 may insert Advertisement C and Advertisement D in the second iteration, which may relate to a different product or target demographic. Alternatively, the third advertisement 358, 358c and the fourth advertisement 358, 358d may be predetermined for the second iteration, regardless of the selection 366, 366a made during the first iteration. For example, the Advertisement C and Advertisement D may be identified and inserted as the third advertisement 358, 358c and the fourth advertisement 358, 358d regardless of whether the user 20 selected Advertisement A or Advertisement B in the first iteration.

With the third advertisement 358, 358c and the fourth advertisement 358, 358d identified, the advertisement manager 332 provides the advertisements 358 to the overlay 362, 362b, and the inserter communicates the overlay 362, 362b to the television 30, 30a for display to the user 20. As shown in FIG. 3D, the third advertisement 358, 358c and the fourth advertisement 358, 358d may be displayed as a third interactive portion 364, 364c and a fourth interactive portion 364, 364d. As discussed above with respect to the first iteration, once the overlay 362, 362b is displayed on the television, the third interactive portion 364, 364c and the fourth interactive portion 364, 364d may be user-selectable.

In the example of FIGS. 3C and 3D, the fourth interactive portion 364, 364d including the fourth advertisement 358, 358d (Advertisement F) is selected by the user 20, as signified by the hand and the dashed box. The content manager 32 records the advertisement selection 366, 366b in the advertisement data source 350, and the advertisement selection 366, 366b is included in the advertisement selection history 356 of the user profile 352, as shown in FIG. 3A. Referring to the binary tree 390, 390b of FIG. 3D, in the second iteration the advertisement selection history 356, 356b advances from the second leaf node 392, 392b to a sixth leaf node 392, 392f, representing the selection 366, 366b of Advertisement F. Accordingly, the user profile 352 is further developed, and indicates with a second certainty that the associated user 20 may be a female.

Successive iterations of the method are executed until the user profile certainty satisfies the user profile certainty threshold. For example, the ACR environment 10 may traverse from the sixth leaf node 392, 392f to a ninth leaf node 392, 392i, and further, to an eleventh leaf node 392, 392k, based on selections 366 made by the user 20.

Figure 4:
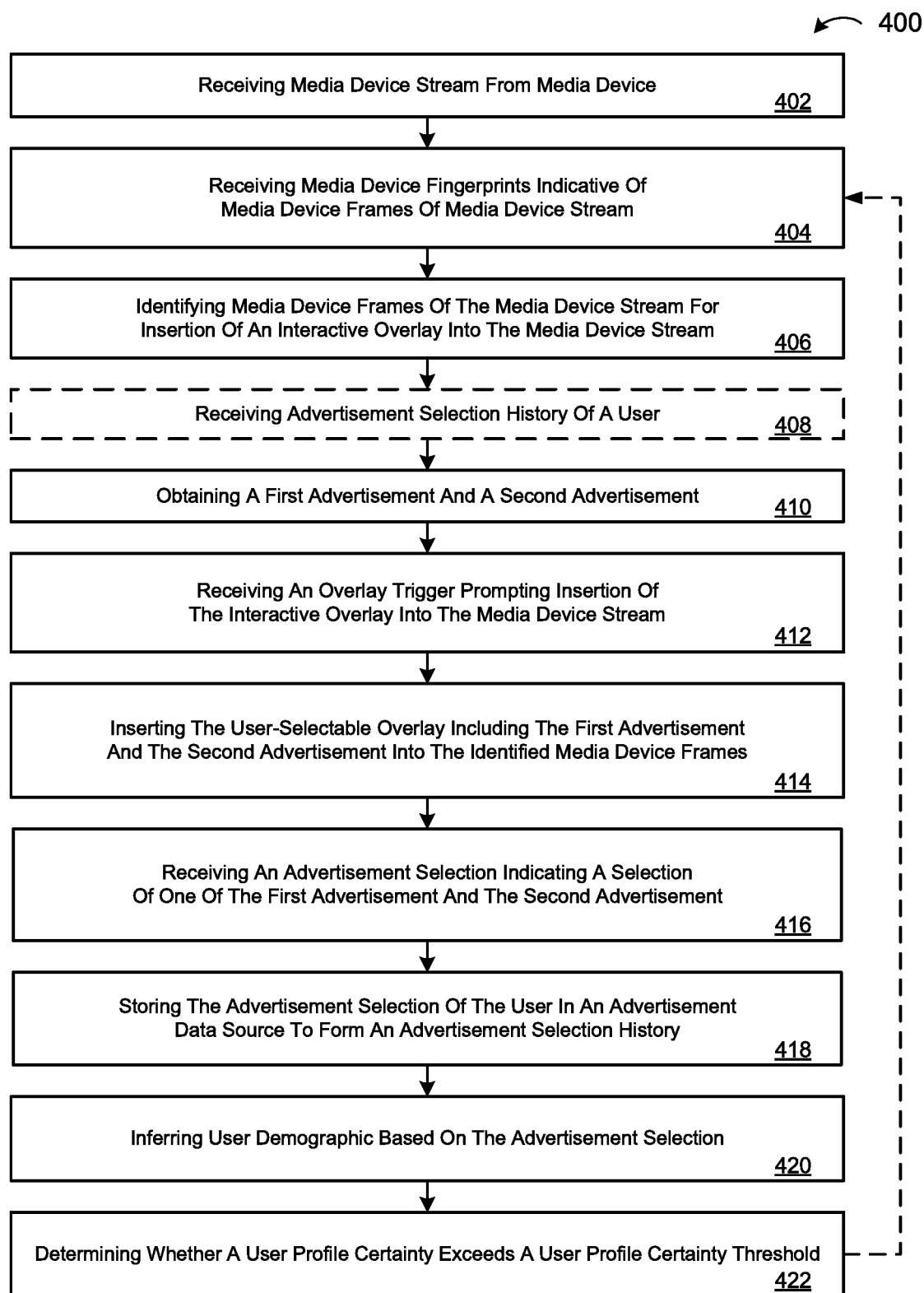
FIG. 4 is a flow diagram for an example method for inferring user demographic information based on an advertisement selection.

FIG. 4 illustrates a method 400 for inferring demographics of the user 20. At block 402, the method 400 includes receiving the media device stream $S_D$ from the media device 30. As discussed above, the media device stream $S_D$ may include a media broadcast stream $S_B$ portion and an additional media content $S_C$ portion. At block 404, the method 400 includes receiving media device fingerprints 222, 222b indicative of media device frames $F_D$ of the media device stream $S_D$ at the corresponding media device 30. At block 406, the method 400 includes identifying a portion of media device frames $F_D$ for insertion of an interactive overlay 362 into the media device stream $S_D$. At block 408, the method 400 may include receiving an advertisement selection history 356 of the user 20. Block 408 may be optional, as signified by the dashed line. For example, in a first iteration of the method 400, the advertisement selection history 356 may not be available. At block 410, the method 400 includes obtaining a first advertisement 358 and a second advertisement 358. When block 408 is executed in the method 400, block 410 may include obtaining the first advertisement 358 and the second advertisement 358 based on the advertisement selection history 356. However, when block 408 is not executed in the method 400, such as in a first iteration, the first advertisement 358 and the second advertisement 358 may be predetermined. At block 412, the method 400 may include receiving an overlay trigger 342 to prompt insertion of the overlay 362 into the media device stream $S_D$. At block 414, the method 400 includes inserting the interactive overlay 362 including the first advertisement 358 and the second advertisement 358 into the identified media device frames $F_D$. At block 416, the method 400 includes receiving an advertisement selection 366 indicating an impression of the user 20 with respect to the first advertisement 358 and the second advertisement 358. At block 418, the method 400 includes storing the advertisement selection 366 of the user 20 in an advertisement data source 350 to initialize or develop the advertisement selection history 356. At block 420, the method 400 may include initializing or developing a user profile 352 by inferring a demographic classification of the user 20 based on the advertisement selection 366. At block 422, the method 400 may include determining whether a user profile certainty satisfies a user profile certainty threshold. If the user profile certainty does not satisfy the user profile certainty threshold, the method returns to block 404 to execute another iteration. If the user profile certainty does exceed the user profile certainty threshold, the method 400 may be completed.

Figure 5:
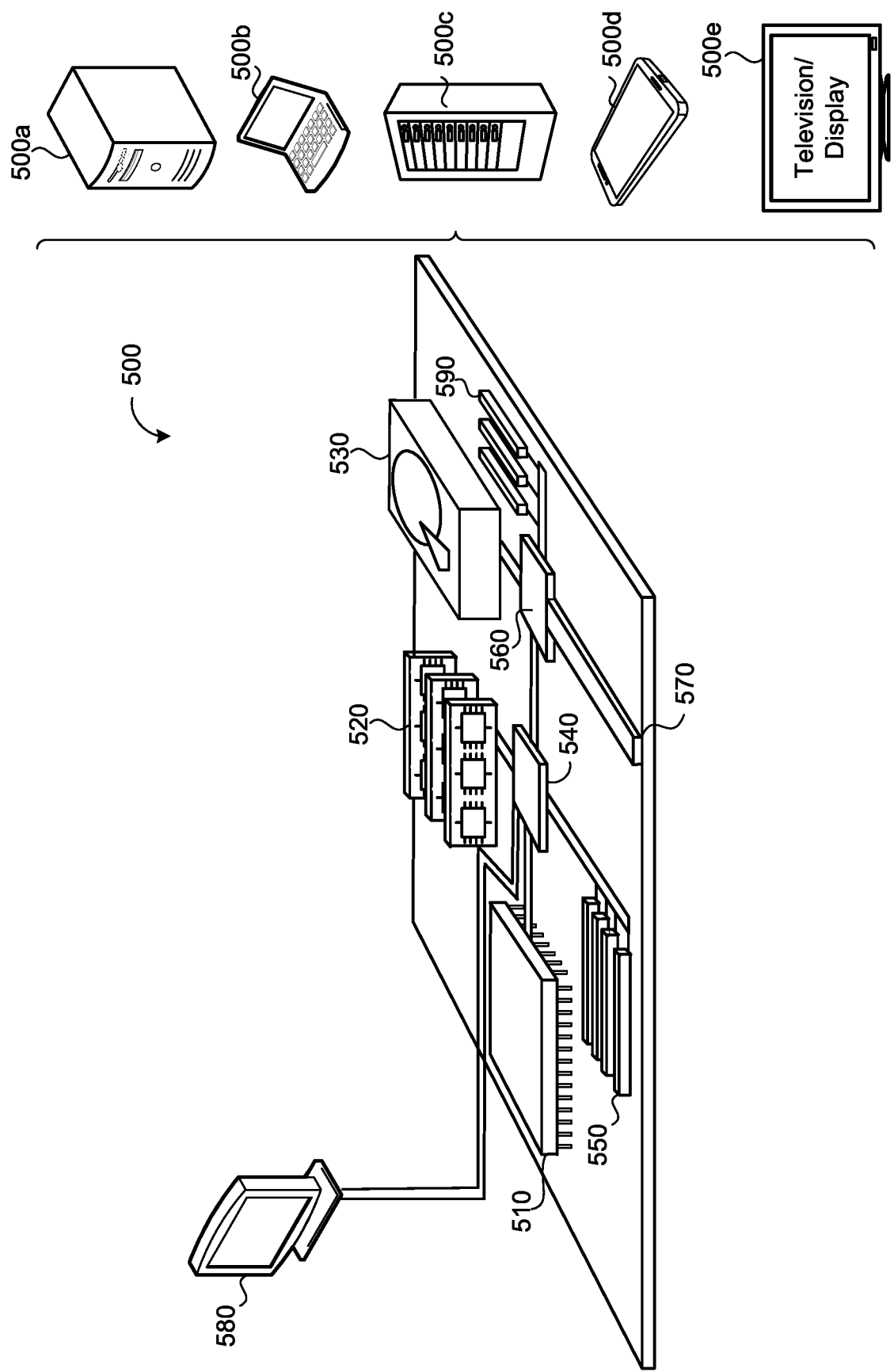
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low-speed interface/controller 560 connecting to a low-speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high-speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store applications (e.g., sequences of instructions) or data (e.g., application state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot applications). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high-speed controller 540 manages bandwidth-intensive operations for the computing device 500, while the low-speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in FIG. 5. For example, it may be implemented as a standard server 500a or multiple times in a group of such servers 500a, as a laptop computer 500b, as part of a rack server system 500c, as part of a handheld device 500d, or as part of a smart television 500e.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer applications that are executable and/or interpretable on a programmable system including at least one programmable processor, which may be special or general purpose, coupled to receive data and instructions from, and to transmit data and instructions to, a storage system, at least one input device, and at least one output device.

These computer applications (also known as computer programs, software, software applications or code) include machine instructions for a programmable processor, and can be implemented in a high-level procedural and/or object-oriented programming language, and/or in assembly/machine language. A software application (i.e., a software resource) may refer to computer software that causes a computing device to perform a task. Example applications include, but are not limited to, system diagnostic applications, system management applications, system maintenance applications, word processing applications, spreadsheet applications, messaging applications, media streaming applications, social networking applications, and gaming applications.

As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

The invention claimed is:

1. A method performed by a computing system, the method comprising:
    selecting a first demographic classification within a first demographic category and a second demographic classification within a second demographic category based on a first selection of a first advertisement received via a user interface of a media device;
    replacing a first video frame of a media device stream that is queued for playback by the media device with a second video frame that includes a second advertisement and a third advertisement, wherein the second advertisement corresponds to the first demographic classification within the first demographic category and the third advertisement corresponds to the second demographic classification within the second demographic category;
    receiving, via the user interface, a second selection of either the second advertisement or the third advertisement; and
    determining a user characteristic based on the second selection.

2. The method of claim 1, further comprising storing data representing the user characteristic in a database.

3. The method of claim 1, further comprising:
    designating, for replacement, a third video frame of the media device stream that is queued for playback by the media device;
    replacing the third video frame with a fourth video frame that includes a fourth advertisement and a fifth advertisement;
    receiving, via the user interface, a third selection of either the fourth advertisement or the fifth advertisement; and
    verifying the user characteristic based on the third selection.

4. The method of claim 1, wherein the second advertisement corresponds to a first leaf node of a binary tree and the third advertisement corresponds to a second leaf node of the binary tree, the second leaf node sharing a common parent node with the first leaf node, the binary tree comprising a plurality of leaf nodes, each leaf node of the plurality of leaf nodes having a corresponding advertisement with a corresponding demographic.

5. The method of claim 4, wherein the common parent node corresponds to the first advertisement.

6. The method of claim 1, further comprising receiving a trigger, wherein replacing the first video frame with the second video frame comprises replacing the first video frame with the second video frame in response to receiving the trigger.

7. The method of claim 1, wherein determining the user characteristic comprises comparing a user profile certainty with a user profile certainty threshold.

8. A computing system comprising:
    a processor; and
    a computer readable medium storing instructions that, when executed by the processor, cause the computing system to perform functions comprising:
        selecting a first demographic classification within a first demographic category and a second demographic classification within a second demographic category based on a first selection of a first advertisement received via a user interface of a media device;
        replacing a first video frame of a media device stream that is queued for playback by the media device with a second video frame that includes a second advertisement and a third advertisement, wherein the second advertisement corresponds to the first demographic classification within the first demographic category and the third advertisement corresponds to the second demographic classification within the second demographic category;
        receiving, via the user interface, a second selection of either the second advertisement or the third advertisement; and
        determining a user characteristic based on the second selection.

9. The computing system of claim 8, the functions further comprising storing data representing the user characteristic in a database.

10. The computing system of claim 8, the functions further comprising:
- designating, for replacement, a third video frame of the media device stream that is queued for playback by the media device;
- replacing the third video frame with a fourth video frame that includes a fourth advertisement and a fifth advertisement;
- receiving, via the user interface, a third selection of either the fourth advertisement or the fifth advertisement; and
- verifying the user characteristic based on the third selection.

11. The computing system of claim 8, wherein the second advertisement corresponds to a first leaf node of a binary tree and the third advertisement corresponds to a second leaf node of the binary tree, the second leaf node sharing a common parent node with the first leaf node, the binary tree comprising a plurality of leaf nodes, each leaf node of the plurality of leaf nodes having a corresponding advertisement with a corresponding demographic.

12. The computing system of claim 11, wherein the common parent node corresponds to the first advertisement.

13. The computing system of claim 8, the functions further comprising receiving a trigger, wherein replacing the first video frame with the second video frame comprises replacing the first video frame with the second video frame in response to receiving the trigger.

14. The computing system of claim 8, wherein determining the user characteristic comprises comparing a user profile certainty with a user profile certainty threshold.

15. A non-transitory computer readable medium storing instructions that, when executed by a computing system, cause the computing system to perform functions comprising:
- selecting a first demographic classification within a first demographic category and a second demographic classification within a second demographic category based on a first selection of a first advertisement received via a user interface of a media device;
- replacing a first video frame of a media device stream that is queued for playback by the media device with a second video frame that includes a second advertisement and a third advertisement, wherein the second advertisement corresponds to the first demographic classification within the first demographic category and the third advertisement corresponds to the second demographic classification within the second demographic category;
- receiving, via the user interface, a second selection of either the second advertisement or the third advertisement; and
- determining a user characteristic based on the second selection.

16. The non-transitory computer readable medium of claim 15, the functions further comprising storing data representing the user characteristic in a database.

17. The non-transitory computer readable medium of claim 15, the functions further comprising:
- designating, for replacement, a third video frame of the media device stream that is queued for playback by the media device;
- replacing the third video frame with a fourth video frame that includes a fourth advertisement and a fifth advertisement;
- receiving, via the user interface, a third selection of either the fourth advertisement or the fifth advertisement; and
- verifying the user characteristic based on the third selection.

18. The non-transitory computer readable medium of claim 15, wherein the second advertisement corresponds to a first leaf node of a binary tree and the third advertisement corresponds to a second leaf node of the binary tree, the second leaf node sharing a common parent node with the first leaf node, the binary tree comprising a plurality of leaf nodes, each leaf node of the plurality of leaf nodes having a corresponding advertisement with a corresponding demographic.

19. The non-transitory computer readable medium of claim 18, wherein the common parent node corresponds to the first advertisement.

20. The non-transitory computer readable medium of claim 15, the functions further comprising receiving a trigger, wherein replacing the first video frame with the second video frame comprises replacing the first video frame with the second video frame in response to receiving the trigger.

* * * * *